(12) United States Patent
Wild

(10) Patent No.: US 7,728,248 B1
(45) Date of Patent: Jun. 1, 2010

(54) METHOD FOR FORMING PRECISION CLOCKPLATE WITH PIVOT PINS

(75) Inventor: Ronald L. Wild, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 499 days.

(21) Appl. No.: 11/764,260

(22) Filed: Jun. 18, 2007

(51) Int. Cl.
*B23H 9/00* (2006.01)
(52) U.S. Cl. .................................. 219/69.17
(58) Field of Classification Search .............. 219/69.12, 219/69.17; 384/117
See application file for complete search history.

(56) References Cited

U.S. PATENT DOCUMENTS

| | | | |
|---|---|---|---|
| 5,185,507 A | | 2/1993 | Yasui |
| 5,438,178 A | * | 8/1995 | Buhler et al. ............ 219/69.12 |
| 6,177,644 B1 | * | 1/2001 | Wilkie et al. ............ 219/69.17 |
| 6,376,793 B1 | | 4/2002 | Mohri et al. |
| 6,781,082 B1 | | 8/2004 | Osborne |
| 2008/0253706 A1 | * | 10/2008 | Bischof et al. ............ 384/117 |

OTHER PUBLICATIONS

Qu, J., et al., "Development of the Cylindrical wire Electrical Discharge Machining Process, Part 1: Concept, Design, and Material Removal Rate", Transactions of the ASME, vol. 12, Aug. 2002, pp. 702-707.
Fleischer, J., et al., "New Applications for micro-EDM", Journal of materials Processing Technology, vol. 149, pp. 246-249, 2004.
* cited by examiner

*Primary Examiner*—Geoffrey S Evans
(74) *Attorney, Agent, or Firm*—William R. Conley; John P. Hohimer

(57) ABSTRACT

Methods are disclosed for producing a precision clockplate with rotational bearing surfaces (e.g. pivot pins). The methods comprise providing an electrically conductive blank, conventionally machining oversize features comprising bearing surfaces into the blank, optionally machining of a relief on non-bearing surfaces, providing wire accesses adjacent to bearing surfaces, threading the wire of an electrical discharge machine through the accesses and finishing the bearing surfaces by wire electrical discharge machining. The methods have been shown to produce bearing surfaces of comparable dimension and tolerances as those produced by micro-machining methods such as LIGA, at reduced cost and complexity.

23 Claims, 4 Drawing Sheets

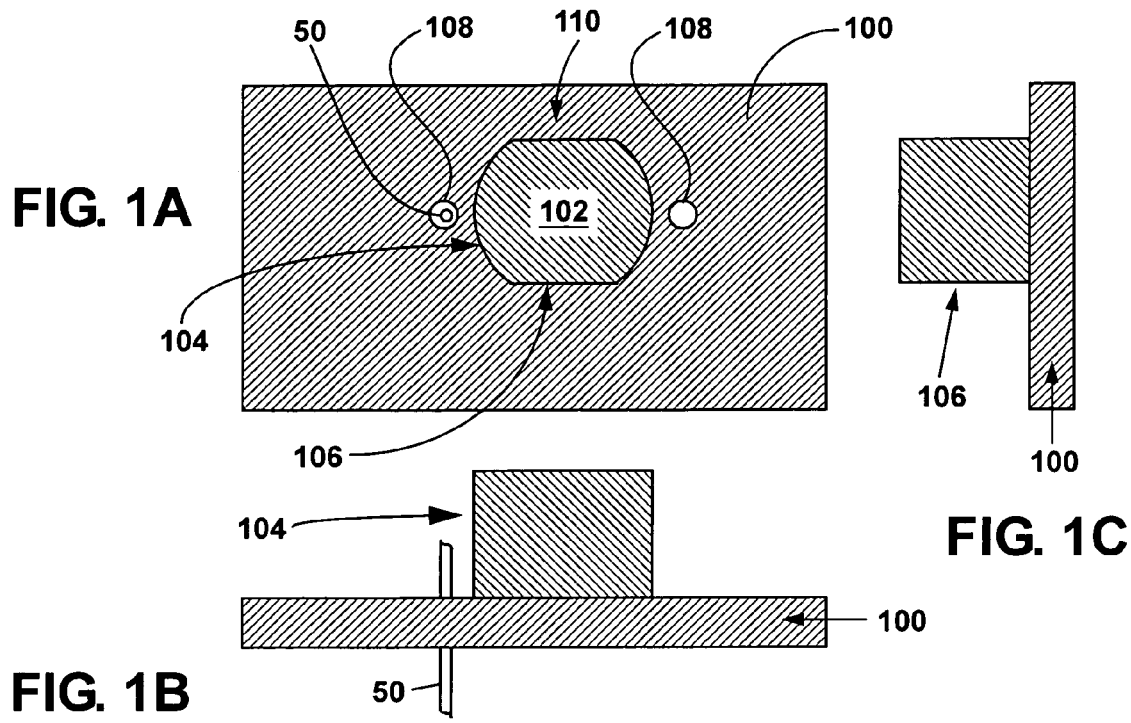
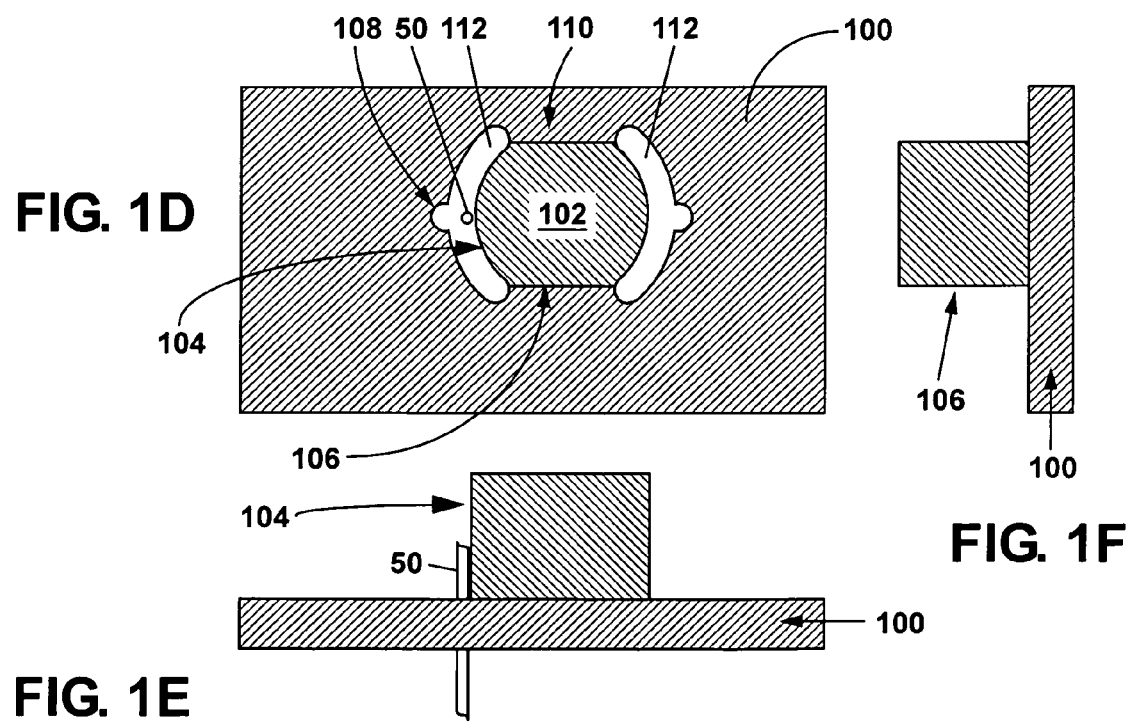

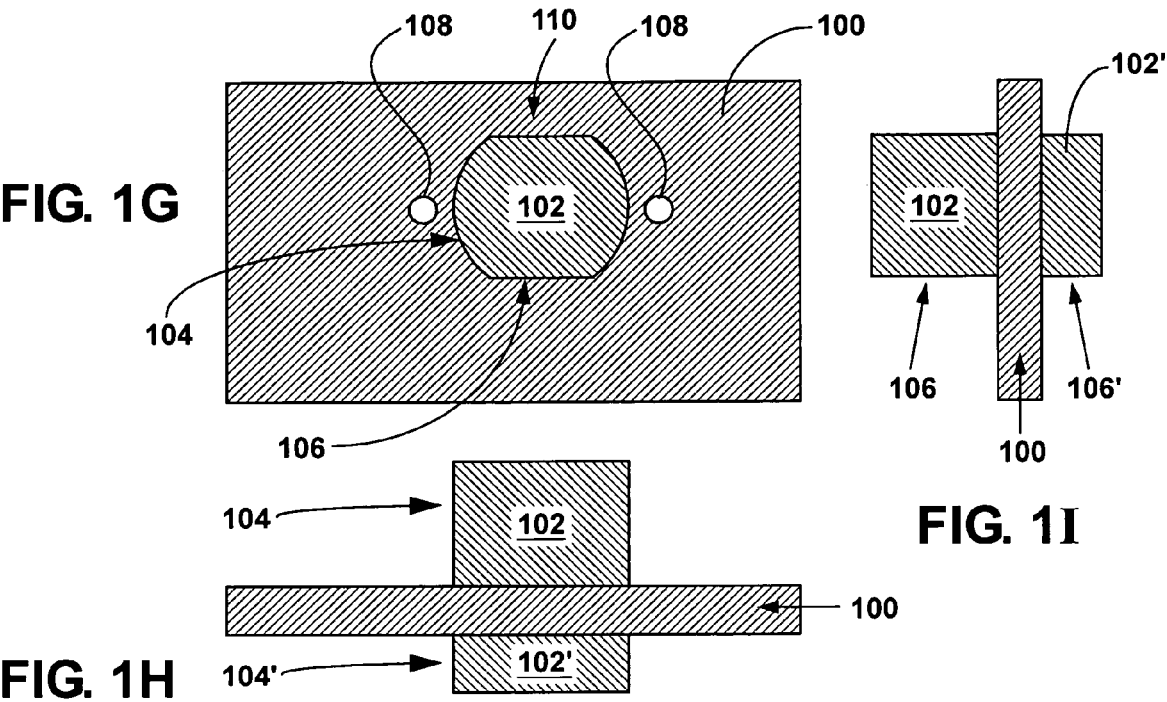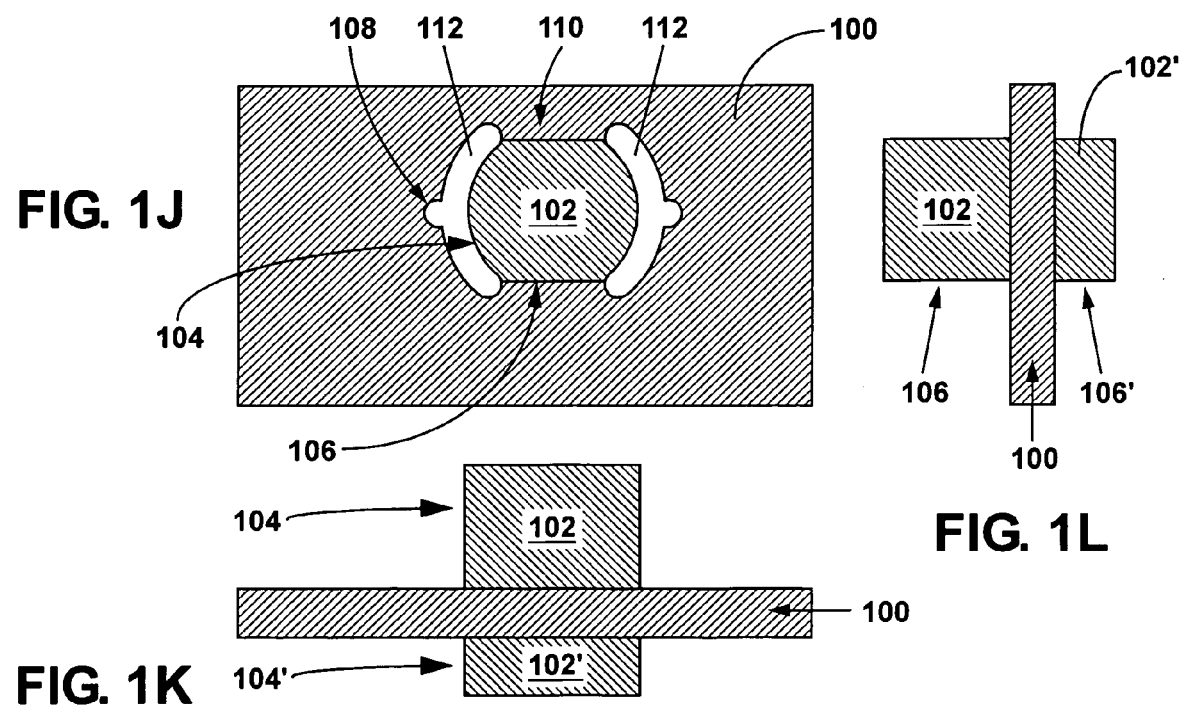

US 7,728,248 B1

METHOD FOR FORMING PRECISION CLOCKPLATE WITH PIVOT PINS

STATEMENT REGARDING FEDERALLY SPONSORED RESEARCH OR DEVELOPMENT

The United States Government has certain rights in this invention pursuant to Department of Energy Contract No. DE-AC04-94AL85000 with Sandia Corporation.

FIELD OF THE INVENTION

The invention generally relates to methods and apparatus for forming precision clockplates with pivot pins. The invention further relates to methods utilizing conventional machining techniques and micro-wire electrical discharge machining (EDM) to form precise bearing surfaces on pivot pins. The invention further relates to pre-forming the bearing surfaces of pivot pins to a first tolerance, and then finishing the bearing surfaces of pivot pins to a final tolerance using micro-wire EDM techniques.

BRIEF DESCRIPTION OF THE DRAWINGS

The accompanying drawings, which are incorporated in and form part of the specification, illustrate several embodiments of the present invention and, together with the description, serve to explain the principles of the invention. The drawings provided herein are not drawn to scale.

FIGS. 1A through 1L are schematic illustrations of embodiments of clockplates with pivot pins and methods to form same, according to the present invention.

DETAILED DESCRIPTION OF THE INVENTION

Figure 2:
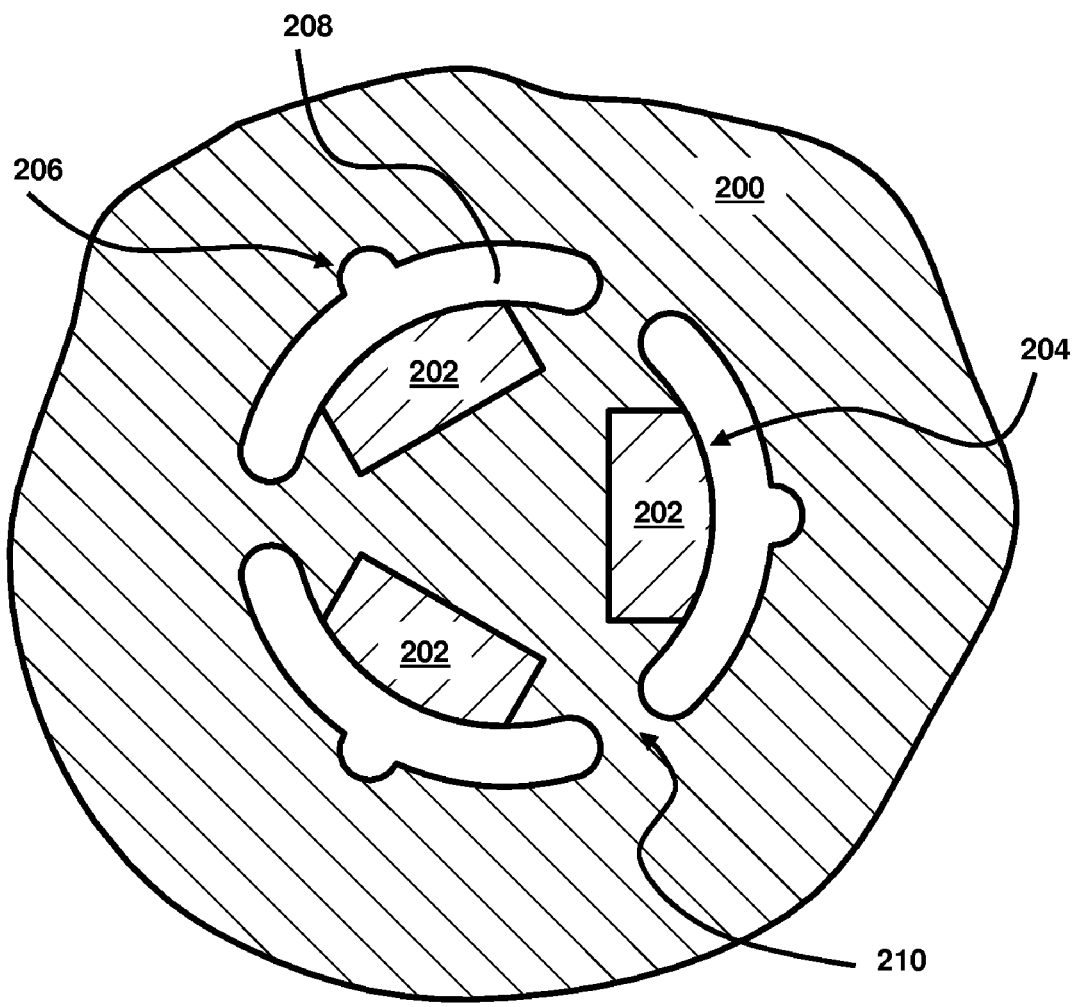
FIG. 2 is a schematic illustration of another embodiment of a clockplate with pivot pins, as can be produced by embodiments of methods according to the present invention.

The methods presented herein provide for forming a precision clockplate having pivot pins with tolerances comparable to that obtainable by micro-machining methods such as LIGA, an acronym based on the first letters of the German words for lithography, electroforming and molding (i.e. lithographie, galvanoformung and abformung) at lower cost and complexity than micro-machining methods. Micro-machining methods are commonly employed to produce highly precise miniaturized devices including micro-electromechanical systems (e.g. MEMs). "Clockplate" is a generic term applied to a base for mounting and accurately positioning bearing surfaces (e.g. pins and/or pivot pins) on which rotatable elements such as wheels, gears and levers etc., are supported. Clockplates can be found in watches, medical instruments, sensors, timers and other mechanisms where required dimensions and tolerances can range down to the order of a millimeter and microns respectively (e.g. for miniature devices). Traditionally, clockplates were manufactured by inserting precisely machined pins (i.e. gauge pins) through corresponding holes in a baseplate, either press-fit or subsequently welded into place. As required tolerances have become smaller than traditional processes can provide, LIGA was one option manufacturers of precision devices had turned to.

LIGA has been used to fabricate highly precise clockplates and miniaturized mechanical components (e.g. sensors and actuators) as described for example, in U.S. Pat. No. 7,066,004 to Kohler et. al., Jun. 27, 2004, herein incorporated by reference. While attractive from a batch processing standpoint, LIGA suffers in process complexity, cost, and the need for a large radiation source. Embodiments of the present invention provide a lower cost alternative that can provide the precision of the LIGA method.

FIGS. 1A-C and 1D-F are schematic illustrations of an embodiment of a clockplate with a pivot pin and a method to form same, according to the present invention.

FIGS. 1A-C illustrate the top and side views of an electrically conductive blank into the surface of which a pivot pin 102 has been "rough" machined by conventional methods, with the pin 102 extending above the surface of the blank 100. For example, such rough machining can be accomplished using a precision multi-axis machining center as commercially available from Willemin-Macodel SA, CH-2854, Bassecourt, Switzerland. The pin 102 can have one or more curved bearing surfaces 104 to provide support for a rotatable element (not shown). For example, in the case of a gear or wheel, the curved bearing surfaces 104 can form a portion of a circular hub or axle. In some embodiments of the invention, the curved bearing surfaces of the pin 102 are first "rough" machined to oversize dimensions by such conventional machining and are eventually trimmed (e.g. finished) to their desired final dimension and center location by micro-wire electrical discharge machining (micro-wire EDM).

A micro-wire EDM machine, for example the Agiecut Vertex micro-wire EDM as available from Agie Charmilles Ltd., CH-6616, Losone, Switzerland, can utilize an access (e.g. a through-hole or slot) shown as holes 108 adjacent to the bearing surfaces 104, through which a wire 50 is threaded though the base plate 100 for the finishing operation (see FIGS. 1A and 1B).

FIGS. 1D-F illustrate that after threading the wire 50 of the EDM tool through the access hole 108, the oversize dimensioned curved bearing surface 104 is finish machined by the EDM tool to a desired final dimension by traversing the wire 50 over the curved surface 104, for example under computer numerical control (e.g. CNC), thereby removing material from the bearing surface by the erosion action of the EDM tool. As electrical discharge machining is known in the art, it is not discussed in detail here. See for example, U.S. Pat. No. 6,376,793 to Mohri et. al., Apr. 23, 2002, herein incorporated by reference. Traversal of the wire 50 over the bearing surface 104 causes formation of an arc shaped slot 112 in the base 100. In this manner, the bearing surfaces 104 of the pivot pin 102 can be produced with LIGA precision, at much lower cost and complexity.

The clockplate comprises the base with pin 102 having curved bearing surfaces 104 and webs or "spokes" 110 that secure the pin 102 to the base 100 on either side of the access holes 108. Non-bearing surfaces 106 can be "relief" machined (e.g. as flats, or cut backs) to prevent conventionally machined (e.g. low precision) surfaces from being bearing surfaces (e.g. requiring high precision). In this manner, highly precise bearing surfaces 104 can be defined on the pivot pin 102, while conventionally, i.e. "rough" machined surfaces 106 can be prevented from contacting precision rotatable elements. The slots 112 cut into the base 100 do not completely encircle the pin 102 thereby providing spokes 110 as shown in FIG. 1D for integrally supporting the pin 102 in the base 100, and forming the pin 102 as an integral part of the base 100, i.e. pin 102 and base 100 are one piece.

FIG. 2 is a schematic illustration of another embodiment of a precision clockplate with pivot pins as formed according to the methods of the present invention. The clockplate comprises a base 200 into which three pivot pins 202 have been formed, for example, as described above. Access holes 206 have been provided in base 200 and bearing surfaces 204 finish machined with a micro-wire EDM tool, resulting in the formation of concentric arc portions 208. Pivot pins 202 can collectively be arranged to form a large diameter hub comprising three bearing surfaces 204. Spokes 210 secure pins 202 to the integral base 200. The present invention anticipates forming precise bearing surfaces of curved shape that are not necessarily circular, as virtually any form of a curved surface as required for an application could be formed. Additionally, the above embodiments illustrate bearing surfaces being formed on one side or surface of a blank, whereas the present invention is equally applicable to forming bearing surfaces on multiple sides of a blank.

FIGS. 1G-I and 1J-K illustrate an example of the latter, an embodiment where bearing surfaces 104 are formed on multiple sides of a blank 100. In the example presented, a front-to-back registration pin extending from opposed surfaces of the blank is realized. The indicia in FIGS. 1G-I and 1J-K present the same features described above for FIGS. 1A-C and 1D-F. In FIGS. 1G-L, pivot pin 102 is rough machined into a surface of the blank 100. Aligned to pin 102 is pin 102' on the opposed surface of the blank 100, the pivot pin 102' having eventual bearing surface 104' and non-bearing surface 106'. In FIGS. 1J-L, after finish machining by micro-wire EDM, pins 102 and 102' together can comprise a front-to-back registration pin, whereby elements (not shown) on both sides of the blank 100 can be precisely aligned by pins 102 and 102'.

In an exemplary non-limiting application, a stainless steel blank 0.032" in thickness (and nominally 1" in diameter) was processed by methods according to the present invention to have curved bearing surfaces 104, including circular pivot pins 102 of 0.0279" final diameter within tolerances of +/−0.0002". The present methods provide a low-cost alternative to fabricating comparable devices in micro-machining technology, such as LIGA. The blank was "rough" machined as described above to produce an initial pivot pin diameter of 0.030" diameter and 0.001" tolerance, and non-bearing surfaces 106 were relief cut (see for example FIGS. 1A-C and 1D-F). Clearance holes 108 were drilled adjacent to the bearing surfaces 104 to allow the 0.001" diameter wire 50 of a micro-wire electrical discharge machine to pass through. The wire 50 traversed the surface of the bearing surfaces 104 under CNC control to produce a finished pin diameter of 0.0279" and 0.0002" tolerances, the pin 102 being supported by two spokes 110 as illustrated in FIG. 1D.

Figure 3:
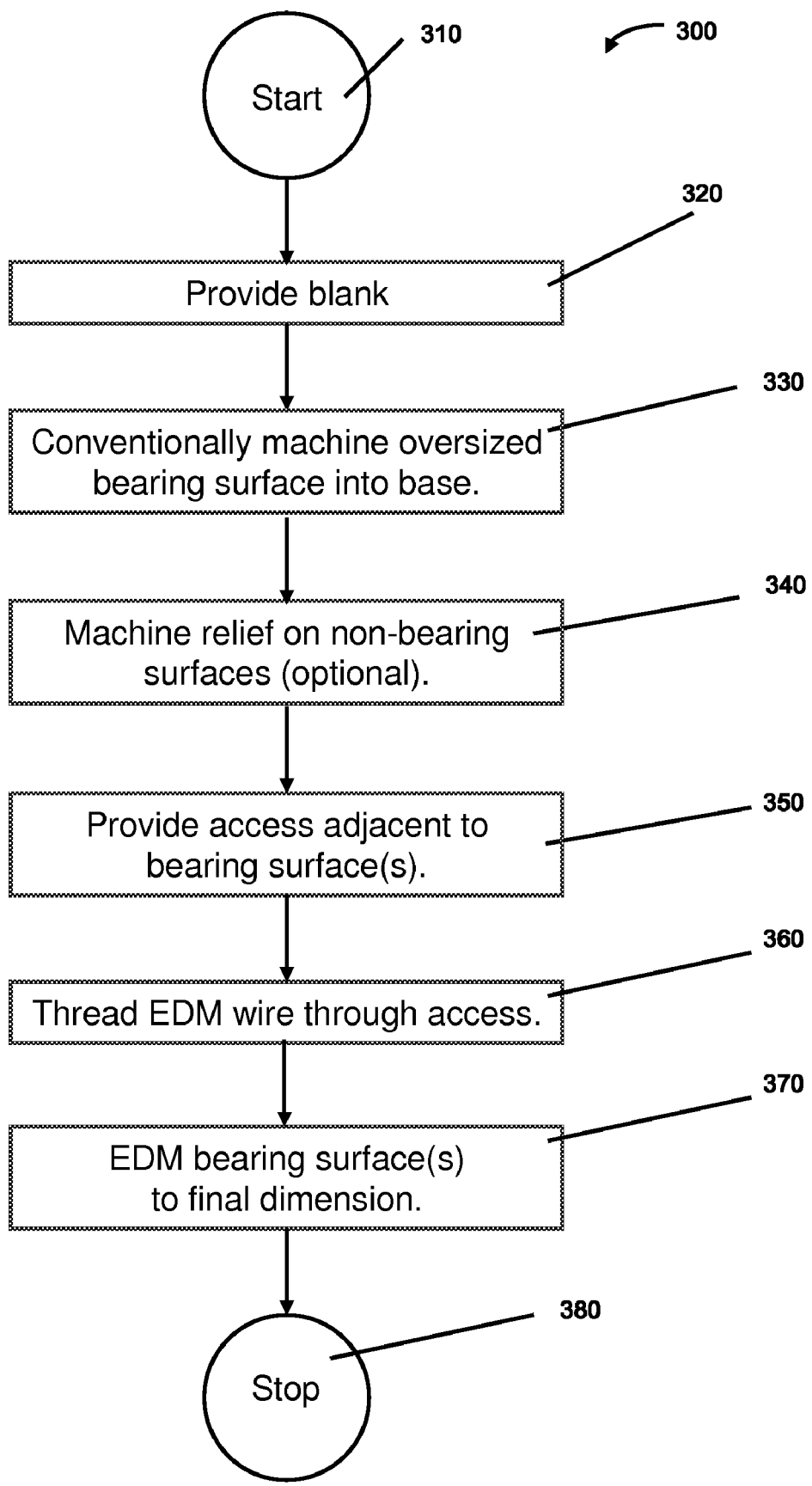
FIG. 3 is a schematic flow chart of an embodiment of a method according to the present invention.

FIG. 3 is a schematic flow chart of an embodiment of a method according to the present invention. The method starts at step 310. At step 320 a blank is provided as the base for a clockplate. The blank can be any material that is appropriate for electrical discharge machining, for example steel, tool steel, stainless steel, titanium and metal carbides. At step 330 curved bearing surfaces (e.g. pivot pins) are rough cut to oversize dimensions into the base. These can be in the form of a monolithic extension from the base surface or multiple extensions from the base surface or extensions on opposite surfaces of the base as to form a front-to-back registration pin. At step 340 non-bearing surfaces that could interfere or interface with rotating elements can optionally be relief cut or otherwise removed from the base. At step 350 wire access is provided as slots or holes, adjacent to the curved bearing surfaces. At step 360 a wire of an electrical discharge machine is threaded through the access. At step 370 the bearing surfaces are finish machined to their final dimension and tolerance. The method ends at step 380.

The above described exemplary embodiments present several variants of the invention but do not limit the scope of the invention. Those skilled in the art will appreciate that the present invention can be implemented in other equivalent ways. The actual scope of the invention is intended to be defined in the following claims.

What is claimed is:

1. A method of forming a clockplate with a pivot pin having one or more curved bearing surfaces, the method comprising:
   providing an electrically conductive blank wherefrom the clockplate and the pivot pin are to be integrally formed;
   forming the pivot pin with the one or more curved bearing surfaces in a surface of the blank, the pivot pin and each of the one or more curved bearing surfaces extending from the surface of the blank, the one or more curved bearing surfaces having an initial dimension greater than a reference value;
   providing one or more wire accesses in the blank, each of the one or more wire accesses being adjacent to one of the curved bearing surfaces;
   passing an electrical discharge wire through at least one of the one or more wire accesses; and,
   finishing at least one of the one or more curved bearing surfaces, said finishing comprising electrical discharge machining the at least one curved bearing surface from the initial dimension to a dimension substantially equal to the reference value.

2. The method of claim 1 further comprising the steps of:
   forming one or more non-bearing surfaces in the surface of the blank, the one or more non-bearing surfaces extending from the surface of the blank; and,
   creating a relief on at least one of the one or more non-bearing surfaces.

3. The method of claim 2 wherein the one or more non-bearing surfaces and the one or more curved bearing surfaces comprise one or more pivot pins.

4. The method of claim 1 wherein the one or more wire accesses comprise one or more selected from the group consisting of a slot extending from an edge of the blank and a through-hole in the blank.

5. The method of claim 1 wherein at least one of the one or more curved bearing surfaces comprises a portion of a circular section.

6. The method of claim 1 wherein the one or more bearing surfaces are disposed on at least two surfaces of the blank.

7. The method of claim 6 wherein the one or more bearing surfaces comprise one or more front-to-back alignment features.

8. A method of forming a precision clockplate with pivot pins, the method comprising:
   providing an electrically conductive blank;
   forming one or more pivot pins in a surface of the blank, each of the one or more pivot pins including at least one curved bearing surface, the at least one curved bearing surface having an initial dimension greater than a reference value;
   providing one or more wire accesses in the blank, each of the one or more wire accesses being adjacent to one of the one or more pivot pins, and with the step of providing one or more wire accesses in the blank forming a plurality of support spokes for at least one of the one or more pivot pins;
   passing an electrical discharge wire through at least one of the one or more wire accesses; and
   finishing the at least one curved bearing surface of at least one of the one or more pivot pins, said finishing comprising electrical discharge machining the at least one curved bearing surface from the initial dimension to a dimension substantially equal to the reference value.

9. A method of forming a precision clockplate with a plurality of pivot pins integral to the clockplate, the method comprising:

providing an electrically conductive blank wherefrom the clockplate and the pivot pins are to be formed;

forming the pivot pins in a surface of the blank, each of the pivot pins including at least one curved bearing surface, the at least one curved bearing surface having an initial dimension greater than a reference value;

providing one or more wire accesses in the blank, each of the one or more wire accesses being adjacent to one of the pivot pins;

passing an electrical discharge wire through at least one of the one or more wire accesses; and, finishing the at least one curved bearing surface of at least one of the pivot pins, said finishing comprising electrical discharge machining the at least one curved bearing surface from the initial dimension to a dimension substantially equal to the reference value.

10. The method of claim 9 wherein the one or more wire accesses comprise one or more selected from the group consisting of a slot extending from an edge of the blank and a through-hole in the blank.

11. The method of claim 9 wherein a plurality of the one or more pivot pins are collectively arranged as a hub for a rotatable member.

12. The method of claim 9 wherein the blank comprises one or more selected from the group consisting of a steel, a tool steel, a stainless steel, titanium and a carbide.

13. The method of claim 9 wherein at least one of the one or more pivot pins comprises at least two bearing surfaces.

14. The method of claim 9 wherein the one or more pivot pins are disposed on at least two surfaces of the blank.

15. The method of claim 14 wherein the one or more pivot pins comprise one or more front-to-back alignment pins.

16. A method of forming a precision clockplate with one or more pivot pins, the method comprising:

providing an electrically conductive blank wherefrom the clockplate and the one or more pivot pins are to be integrally formed;

forming the one or more pivot pins in a surface of the blank, each of the one or more pivot pins including at least one curved bearing surface, the at least one curved bearing surface having an initial dimension greater than a reference value;

creating a relief on at least one non-bearing surface on at least one of the one or more pivot pins;

providing one or more wire accesses in the blank, each of the one or more wire accesses being adjacent to one of the one or more pivot pins;

passing an electrical discharge wire through at least one of the one or more wire accesses; and, finishing at least one curved bearing surface of at least one of the one or more pivot pins, said finishing comprising electrical discharge machining the at least one curved bearing surface from the initial dimension to a dimension substantially equal to the reference value.

17. The method of claim 16 wherein the one or more wire accesses comprise one or more selected from the group consisting of a slot extending from an edge of the blank and a through-hole in the blank.

18. The method of claim 16 wherein a plurality of the one or more pivot pins are collectively arranged as a hub for a rotatable member.

19. The method of claim 16 wherein the blank comprises one or more selected from the group consisting of a steel, a tool steel, a stainless steel, titanium and a carbide.

20. The method of claim 16 wherein at least one of the one or more pivot pins comprises at least two bearing surfaces.

21. The method of claim 16 wherein the one or more pivot pins are disposed on at least two surfaces of the blank.

22. The method of claim 21 wherein the one or more pivot pins comprise one or more front-to-back alignment pins.

23. A method of forming a precision clockplate with pivot pins, the method comprising:

providing an electrically conductive blank;

forming one or more pivot pins in a surface of the blank, each of the one or more pivot pins including at least one curved bearing surface, the at least one curved bearing surface having an initial dimension greater than a reference value;

creating a relief on at least one non-bearing surface on at least one of the one or more pivot pins;

providing one or more wire accesses in the blank, each of the one or more wire accesses being adjacent to one of the pivot pins, and with the step of providing one or more wire accesses in the blank forming a plurality of support spokes for at least one of the one or more pivot pins;

passing an electrical discharge wire through at least one of the one or more wire accesses; and, finishing at least one curved bearing surface of at least one of the one or more pivot pins, said finishing comprising electrical discharge machining the at least one curved bearing surface from the initial dimension to a dimension substantially equal to the reference value.

* * * * *